Walter B. Wilson, Jr.,
*INVENTOR.*

Walter B. Wilson, Jr.,
INVENTOR.

Walter B. Wilson, Jr.,
*INVENTOR.*

BY S. J. Rotondi
A. T. Dupont
Herbert H Murray

Walter B. Wilson, Jr.,
INVENTOR.

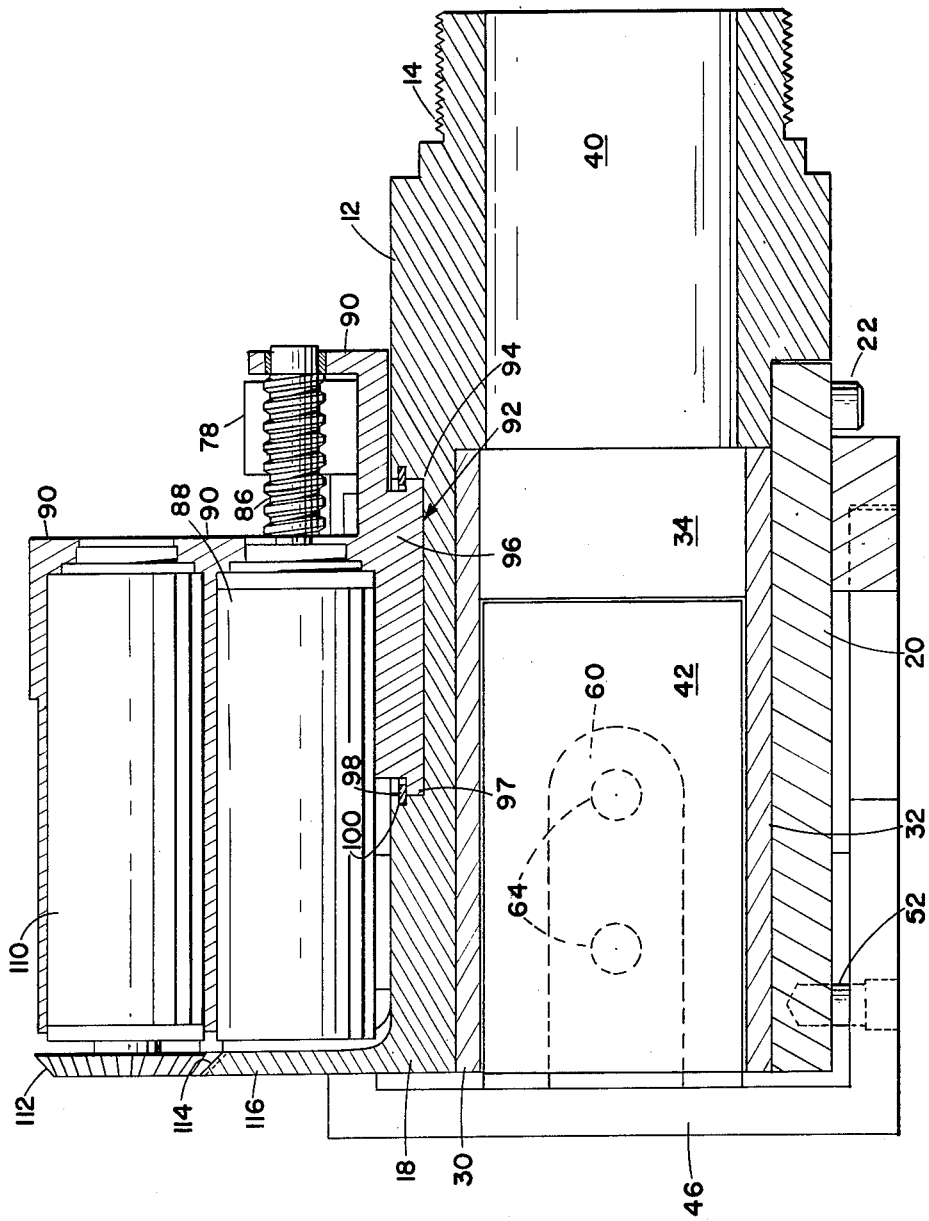

3,194,014
VARIABLE THRUST AND VARIABLE DIRECTION NOZZLE
Walter B. Wilson, Jr., Huntsville, Ala., assignor to the United States of America as represented by the Secretary of the Army
Filed Dec. 19, 1962, Ser. No. 245,940
4 Claims. (Cl. 60—35.55)
(Granted under Title 35, U.S. Code (1952), sec. 266)

The invention described herein may be manufactured and used by or for the Government for governmental purposes without the payment of any royalty thereon.

This invention pertains to a nozzle for use with a missile or rocket motor. More particularly the invention relates to a nozzle wherein the amount of thrust and the direction of thrust can be varied while the missile or rocket is in flight.

In the use of missiles and rockets it is advantageous to be able to vary the amount and direction of the thrust in order to control the flight path of the missile.

An object of the invention is to provide a nozzle in which the unobstructed throat area can be changed to vary the thrust developed by the rocket engine.

Another object of the invention is to provide a nozzle wherein the throat area of the nozzle can be shifted to vary the direction of the thrust developed by the rocket engine.

A further object of the invention is to provide a nozzle wherein the previous objects can be achieved simultaneously.

These and other objects and advantages of the present invention will become apparent from the following description taken in conjunction with the accompanying drawings, wherein:

FIGURE 5 is a section taken on line 5—5 of FIGURE 2.

Figure 4:
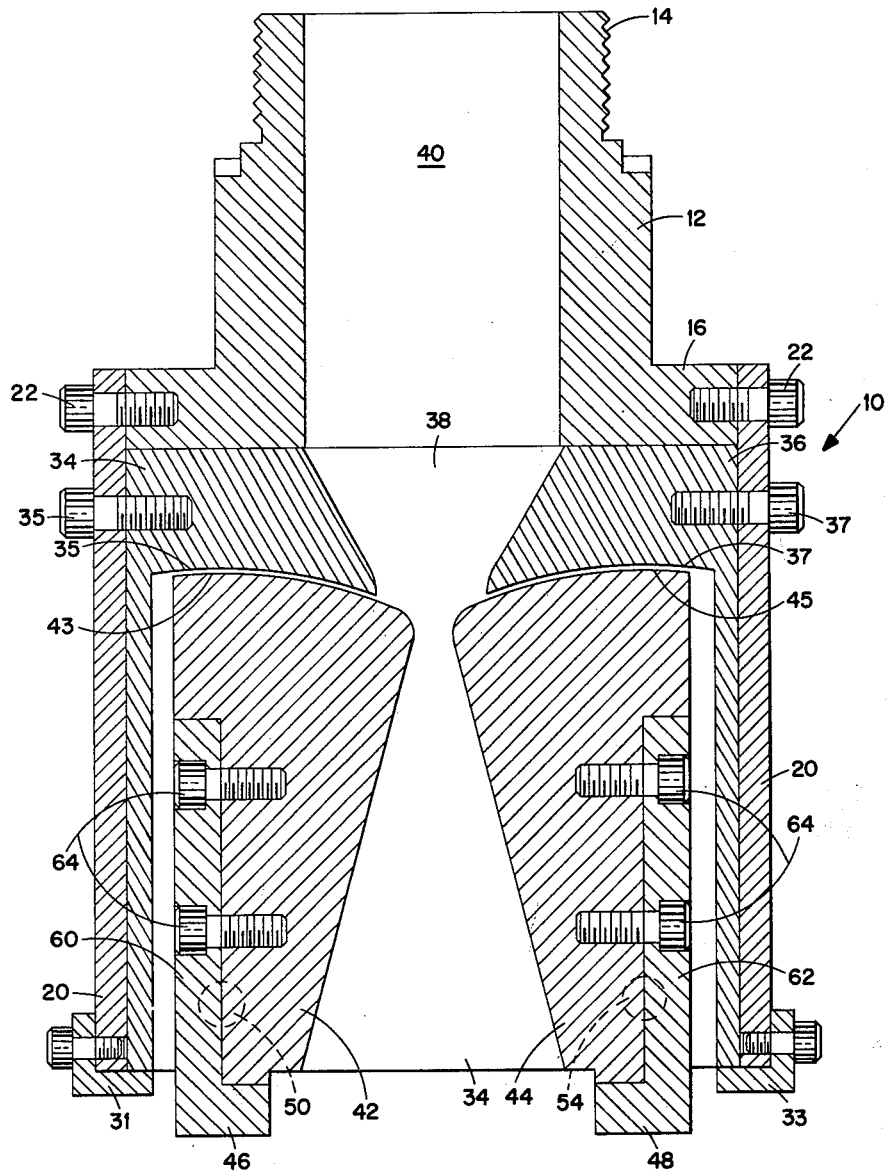
FIGURE 4 is a section taken on line 4—4 of FIGURE 2.

Referring now to the drawings nozzle 10 of the present invention comprises a tubular member 12 (FIGURES 1, 4 and 5) provided with threads 14 at its forward end for attachment to a propellant chamber (not shown). Tubular member 12 terminates in a rectangular transverse portion 16 (FIGURE 4). A flat plate 18 (FIGURES 1, 2 and 5) is formed integral with one edge of rectangular portion 16 and projects rearwardly therefrom. A U-shaped housing member 20 (FIGURES 1 to 4) is fastened to the lateral edges of plate 18 and rectangular portion 16 by cap screws 22 to form a rectangular box-like housing projecting rearwardly from tubular member 12.

Two side plates 30 and 32 (FIGURES 2 and 5) of heat resistant material are mounted adjacent flat plate 18 and the bottom of U-shaped housing member 20, respectively, and are retained in the housing by two L-shaped brackets 31 and 33 bolted to housing member 20. Two fixed shroud members 34 and 36 (FIGURE 4) are mounted one adjacent each of the side plates of U-shaped housing member 20 between plates 30 and 32 by mounting bolts 35 and 37. Shroud members 34 and 36 define a rearwardly and inwardly sloping passageway 38 through which the hot gases coming from the propellant chamber (not shown) and through a bore 40 in tubular element 12 must pass.

Two additional movable shrouds 42 and 44 are mounted on two brackets 46 and 48, respectively. Brackets 46 and 48 (FIGURES 1–5) are U-shaped and are each pivotally mounted on the housing, bracket 46 by axially aligned pivot pins 50 and 52 (FIGURES 1 and 3) contacting flat plate 18 and the bottom of member 20, respectively, and bracket 48 by axially aligned pivot pins 54 and 56 contacting flat plate 18 and the bottom of member 20, respectively.

Brackets 46 and 48 are provided with integral flanges 60 and 62, respectively, (FIGURES 4 and 5) to which shrouds 42 and 44 are fixed by cap screws 64.

The upper ends 43 and 45, respectively, of movable shrouds 42 and 44 are made arcuate about the centers of pivot pins 50 and 52, respectively, and the portions 35 and 37, respectively, of fixed shrouds 34 and 36 which are adjacent to shrouds 42 and 44 are also arcuate about the same centers.

Figure 1:
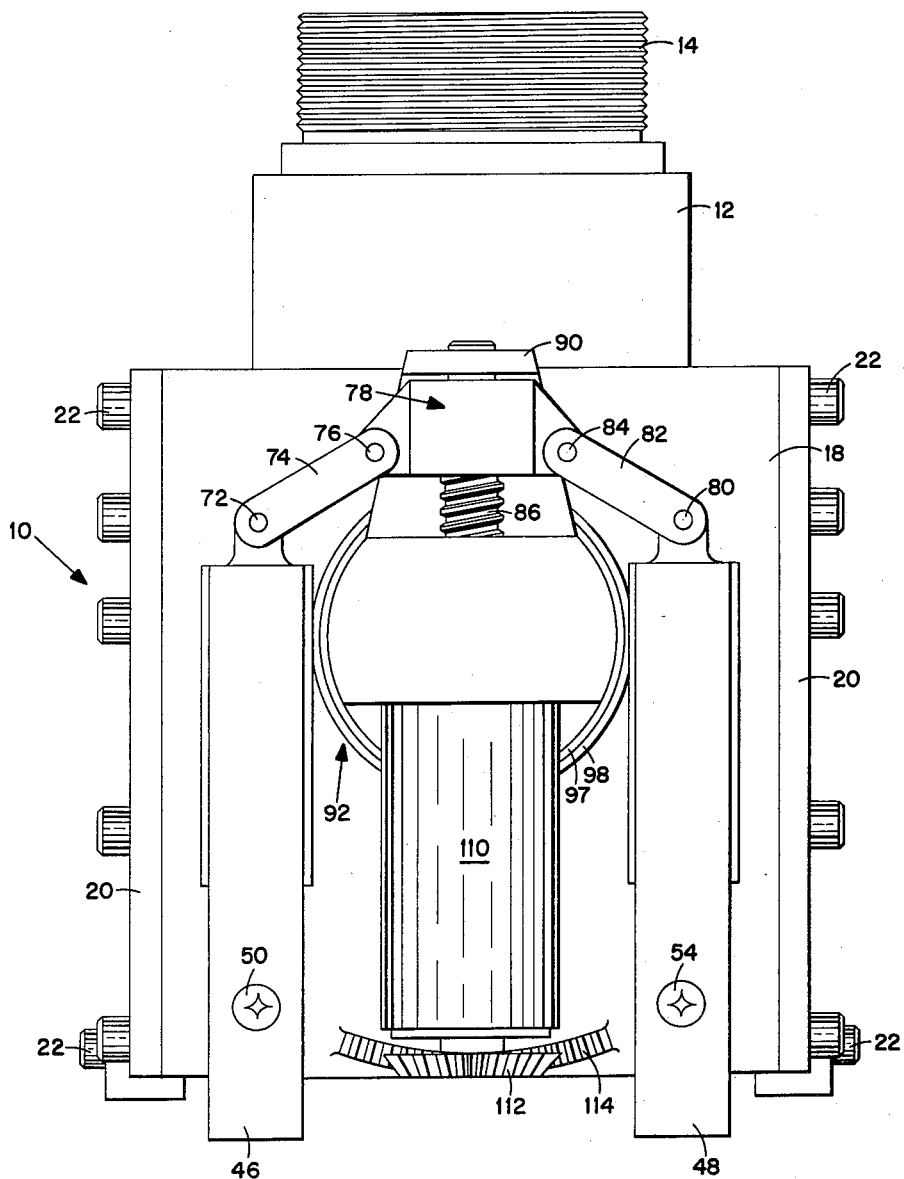
FIGURE 1 is a side elevation of a nozzle assembly incorporating the principles of the invention.
Figure 2:
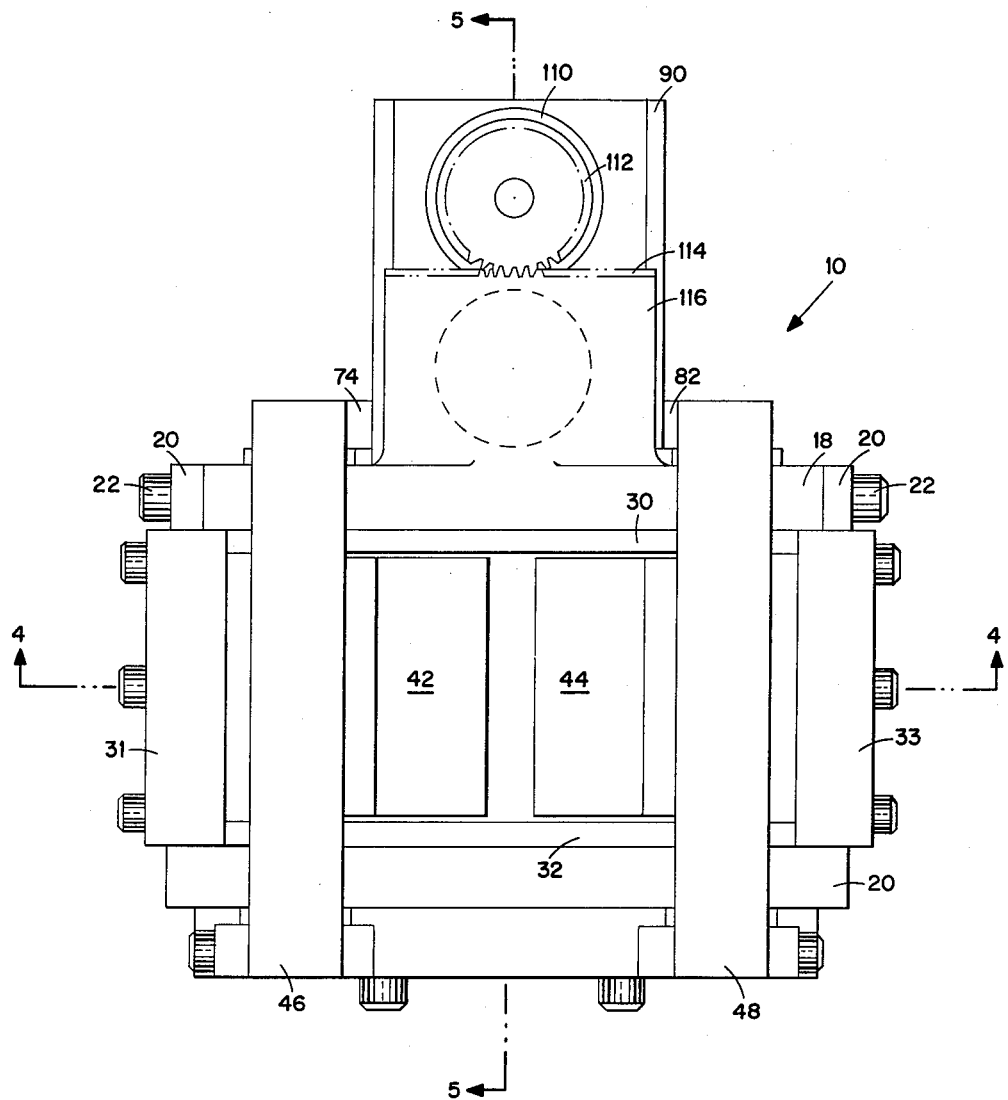
FIGURE 2 is a bottom view of the nozzle shown in FIGURE 1.
Figure 3:
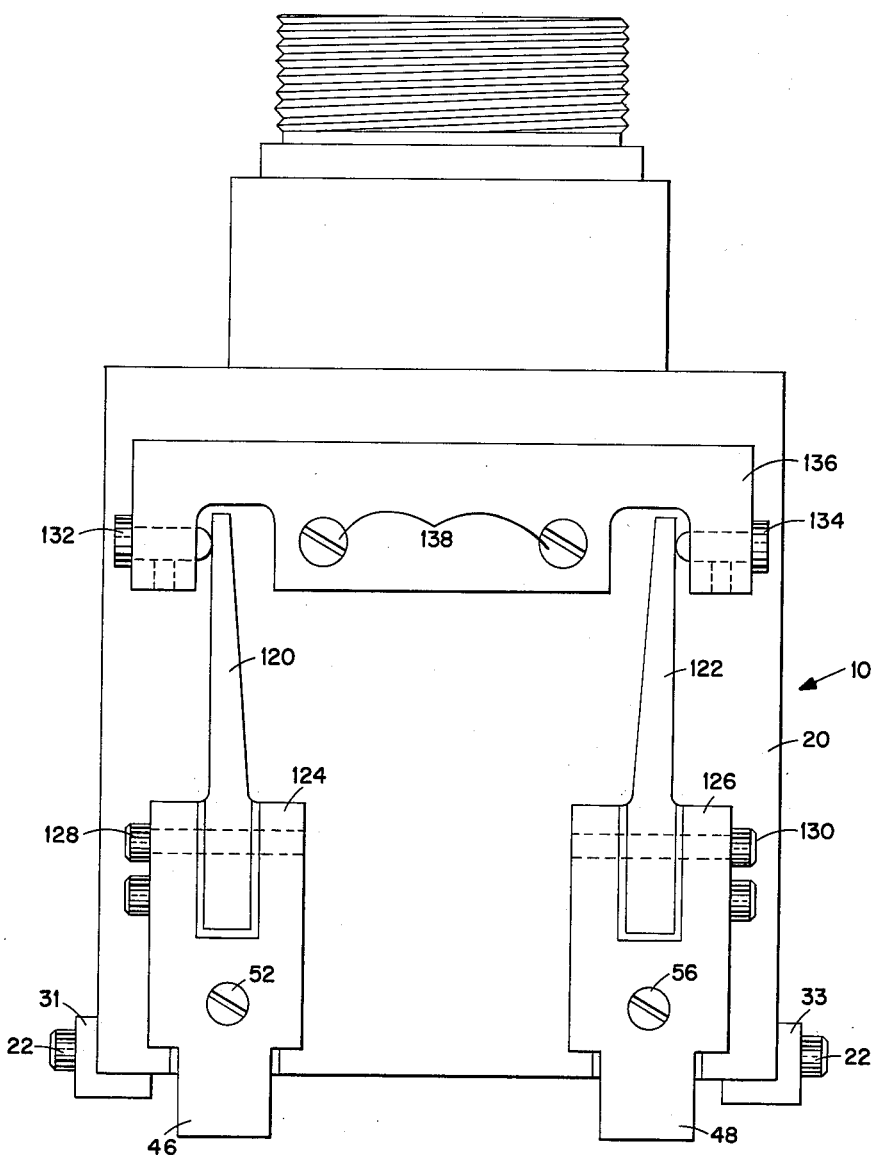
FIGURE 3 is a side elevation showing the side opposite from that illustrated in FIGURE 1.

Referring now to FIGURE 1, the upper end of one leg of bracket 46 is connected by a pivot pin 72 to a link 74 which in turn is connected by a pivot pin 76 to a nonrotatable nut 78. Similarly, a pivot pin 80 connects one leg of bracket 48 to a link 82 which in turn is connected by a pin 84 to nut 78. Nut 78 threadably engages the shaft 86 of a reversible motor 88. Motor 88 is mounted on a bracket 90 (FIGURE 5) pivotally secured at pivot assembly 92 (FIGURES 1 and 5) to plate 18.

Pivot assembly 92 comprises a circular recess 94 in member 12 and a cylindrical projection 96 on bracket 90 which projects into said recess. Projection 96 is provided with a peripheral flange 97 and a snap ring 98 secured within a groove 100 in the wall of recess 94 which bears against flange 97 to retain the projection 96 of bracket 90 in the recess.

A second reversible motor 110 is mounted on bracket 90. A bevel gear 112 fixed to the shaft of motor 110 meshes with an arcuate rack 114 on a flange 116 which projects laterally from plate 12.

Brackets 46 and 48 are spring biased by large leaf springs 120 and 122, respectively, (FIGURE 3) in a direction to move the forward ends of movable shrouds 42 and 44 (FIGURE 4) toward each other. Springs 120 and 122 (FIGURE 3) are fixed to bifurcated ends 124 and 126, respectively, of brackets 46 and 48 by bolts 128 and 130, respectively. The distal ends of springs 120 and 122 bear against a pair of adjustable stop pins 132 and 134, respectively, carried by a bracket 136 fixed to the outer surface of U-shaped housing element 20 by cap screws 138. The spring bias applied to brackets 46 and 48 is provided to help compensate for the reaction thrust on shrouds 42 and 44 applied by the gases passing therebetween.

In the operation of the nozzle described herein, when it is desired to change the amount of thrust, motor 88 is energized in one direction or the other to turn shaft 86 within non-rotatable nut 78. Movement of nut 78 forward will cause movable shrouds 42 and 44 to swing inward toward each other conversely, rearward movement of nut 78 will cause the shrouds to swing outward away from each other. If it is desired to change the direction of thrust, motor 110 is energized to swing bracket 90 about pivot assembly 92. Swinging movement of bracket 90 causes shrouds 42 and 44 to both move in the same direction thus changing the direction of the gas stream passing therebetween to vary the direction of thrust.

From the foregoing description it may be seen that the thrust developed in the nozzle may be varied both in direction and intensity either individually or simultaneously.

While a preferred embodiment of the invention has been shown and described in this specification, it should be noted that various changes could be made in the construction of the nozzle without departing from the spirit of the invention as defined in the appended claims.

The invention having thus been described, what is claimed as new and desired to be protected by Letters Patent is:

1. In a missile having a rocket motor a variable nozzle comprising, means defining a rectangular chamber connected to said rocket motor, two flat side plates mounted one adjacent each of two opposed sides of said chamber, two fixed shrouds mounted one adjacent each of the other two opposed sides, said fixed shrouds defining a converging section of said nozzle, two movable shrouds mounted adjacent said fixed shrouds for pivotal movement with respect thereto, said movable shrouds defining the throat area and diverging portion of said nozzle, means for moving said movable shrouds simultaneously either toward or away from each other to change the size of the throat area, and means for moving said movable shrouds simultaneously in the same direction to locate the throat area off center to vary the direction of thrust.

2. A variable nozzle as set forth in claim 1 wherein said movable shrouds are mounted on pivotally mounted brackets and wherein said shroud moving means includes a traveling nut, link means connecting the forward ends of said brackets to said traveling nut, first reversible motor means having a threaded shaft engaging said traveling nut, said first motor means being pivotally mounted, second reversible motor means connected to said first motor means, a gear connected to said second motor means, and an arcuate rack on the housing of said nozzle and engaging said gear.

3. A variable nozzle as set forth in claim 2 wherein said movable shrouds are spring biased toward each other to counteract the force of gases passing through the nozzle to lessen the pressure on the linkage for adjusting the throat opening.

4. A variable nozzle as set forth in claim 3 wherein the spring bias is applied by leaf springs fixed to said brackets, and adjustable stop screws mounted on the nozzle housing and abutting the distal ends of said leaf springs.

References Cited by the Examiner
UNITED STATES PATENTS

| | | |
|---|---|---|
| 1,001,290 | 8/11 | McKee. |
| 2,488,174 | 11/49 | Clegern. |
| 2,551,372 | 5/51 | Haltenberger. |
| 2,933,891 | 4/60 | Britt _____ 60—35.55 |
| 3,038,305 | 6/60 | Price _____ 60—35.6 X |
| 3,040,523 | 6/62 | Price _____ 60—35.6 |

FOREIGN PATENTS 775,616   10/34   France.

SAMUEL LEVINE, *Primary Examiner.*

ABRAM BLUM, *Examiner.*